(12) United States Patent
Elumalai et al.

(10) Patent No.: US 12,485,498 B2
(45) Date of Patent: Dec. 2, 2025

(54) METHOD AND SYSTEM OF IDENTIFYING A WELDMENT FEATURE

(71) Applicant: HCL Technologies Limited, New Delhi (IN)

(72) Inventors: Hari Krishnan Elumalai, Chennai (IN); Pankaj Gupta, Mumbai (IN); Rajesh Chakravarty, Mumbai (IN); Pankaj Panda, Mumbai (IN)

(73) Assignee: HCL Technologies Limited, New Delhi (IN)

( * ) Notice: Subject to any disclaimer, the term of this patent is extended or adjusted under 35 U.S.C. 154(b) by 802 days.

(21) Appl. No.: 17/842,886

(22) Filed: Jun. 17, 2022

(65) Prior Publication Data

US 2023/0311231 A1 Oct. 5, 2023

(51) Int. Cl.
*B23K 9/127* (2006.01)
*B23K 9/095* (2006.01)
(Continued)

(52) U.S. Cl.
CPC .......... *B23K 9/1274* (2013.01); *B23K 9/0953* (2013.01); *B23K 26/24* (2013.01);
(Continued)

(58) Field of Classification Search
CPC .... B23K 9/1274; B23K 9/0953; B23K 26/24; B23K 2101/18; B23K 2103/50;
(Continued)

(56) References Cited

U.S. PATENT DOCUMENTS 10,960,483 B2 * 3/2021 Ge .......................... B23K 9/32
11,345,031 B2 * 5/2022 Miyata ............... G05B 19/4097
(Continued)

FOREIGN PATENT DOCUMENTS

CN 103969336 B 1/2017
CN 108646689 B 4/2020
(Continued)

OTHER PUBLICATIONS

Tuan Anh Tran, Anderi Lobov, Tord Hansen Kaasa, Morten Bjelland, Ole Terje Midling, CAD Integrated automatic recognition of weld paths, the International Journal of Advanced Manufacturing Technology (2021) 115:2145-2159, Accepted: Apr. 29, 2021 / Published Online: May 20, 2021, 2146-2159,Norway.

*Primary Examiner* — Jesse S Bogue
(74) *Attorney, Agent, or Firm* — Kendal M. Sheets

(57) ABSTRACT

The disclosure relates to method and system for identifying a weldment feature. The method may include extracting a plurality of wire bodies from a sheet-metal model, and identifying from the plurality of wire bodies, a set of wire bodies associated with a face of the sheet-metal model. The method may further include generating one or more potential weldment features from the set of wire-bodies. Each of the one or more potential weldment features may be analyzed with respect to the face of the sheet-metal model. The method may further include identifying from the one or more potential weldment features, at least one related pair of weldment features. Weldment features of each related pair may include one of a contacting relationship and crossing relationship with each other.

17 Claims, 10 Drawing Sheets

(51) Int. Cl.
  *B23K 26/24* (2014.01)
  *G06T 7/00* (2017.01)
  *G06T 7/13* (2017.01)
  *G06T 7/73* (2017.01)
  *B23K 101/18* (2006.01)
  *B23K 103/00* (2006.01)

(52) U.S. Cl.
  CPC .............. *G06T 7/0004* (2013.01); *G06T 7/13* (2017.01); *G06T 7/73* (2017.01); *B23K 2101/18* (2018.08); *B23K 2103/50* (2018.08); *G06T 2207/30136* (2013.01); *G06T 2207/30152* (2013.01); *G06T 2207/30164* (2013.01)

(58) Field of Classification Search
  CPC ........... B23K 9/02; G06T 7/0004; G06T 7/13; G06T 7/73; G06T 2207/30136; G06T 2207/30152; G06T 2207/30164; G06V 10/255

See application file for complete search history.

(56) References Cited

U.S. PATENT DOCUMENTS

2022/0355407 A1* 11/2022 Fujii .................. B23K 9/04
2024/0311524 A1* 9/2024 Kumar ................ G06F 30/10

FOREIGN PATENT DOCUMENTS

| | | |
|---|---|---|
| CN | 113182738 A | 7/2021 |
| KR | 20210058995 A | 5/2021 |
| TW | 201641931 A | 12/2016 |
| WO | 2021239726 A1 | 12/2021 |

* cited by examiner

METHOD AND SYSTEM OF IDENTIFYING A WELDMENT FEATURE

TECHNICAL FIELD

This disclosure relates generally to manufacturing processes, and more particularly to method and system for automatic identification of a weldment feature in a sheet-metal model.

BACKGROUND

Sheet-metal models and wire bodies are used in manufacturing industry for designing components and for planning the manufacturing of the components. Sheet-metal models mainly include elements like walls, bends, form, and stamp elements. Wire-bodies contains edges and vertices but no faces, or in other words, a wire body is a topologically one-dimensional body representative of a component design. Further, the wire body may include of a single edge or a set of connected edges and may represent open or closed profiles. A weldment is a joining of two different parts or, joining/touching/near-touching regions in a part by way of welding process.

Various techniques are available for providing computer-based representations of physical sheet-metal models. One of these techniques is Boundary Representation, commonly referred to as B-rep. The data of the B-rep part is stored in graph structure, where each node represents a face, and each link/connection represents an edge. The B-rep based computer models can also be "cut" and examined in a manner like an actual part. For these reasons, a B-rep model of a part is known as a "Solid" model. The above models help in evaluating the physical properties (for e.g., mass, volume, the moment of inertia) of the part and in computer-based analysis of stress-strain under different loading conditions.

However, these models fail to provide for automatic recognition of marking lines for weldment in the sheet-metal models that can be used in applications like assembling sheet-metal models and marking for the sheet-metal operations.

SUMMARY

In an embodiment, a method of identifying a weldment feature is disclosed. The method may include extracting a plurality of wire bodies from a sheet-metal model, and identifying from the plurality of wire bodies, a set of wire bodies associated with a face of the sheet-metal model. The method may further include generating one or more potential weldment features from the set of wire-bodies. Each of the one or more potential weldment features may be analyzed with respect to the face of the sheet-metal model. The method may further include identifying from the one or more potential weldment features, at least one related pair of weldment features. Weldment features of each related pair may include one of a contacting relationship and crossing relationship with each other.

In another embodiment, a system for identifying a weldment feature is disclosed. The system includes a processor and a memory. The memory stores a plurality of processor-executable instructions, which upon execution, cause the processor to extract a plurality of wire bodies from a sheet-metal model, and identify from the plurality of wire bodies, a set of wire bodies associated with a face of the sheet-metal model. The plurality of processor-executable instructions, upon execution, further cause the processor to generate one or more potential weldment features from the set of wire-bodies. Each of the one or more potential weldment features may be analyzed with respect to the face of the sheet-metal model. The plurality of processor-executable instructions, upon execution, further cause the processor to identify from the one or more potential weldment features, at least one related pair of weldment features. Weldment features of each related pair may include one of a contacting relationship and crossing relationship with each other.

In yet another embodiment, a non-transitory computer-readable medium storing computer-executable instructions for identifying a weldment feature is disclosed. The computer-executable instructions are configured for: extracting a plurality of wire bodies from a sheet-metal model and identifying from the plurality of wire bodies, a set of wire bodies associated with a face of the sheet-metal model. The computer-executable instructions are further configured for: generating one or more potential weldment features from the set of wire-bodies, wherein each of the one or more potential weldment features is analysed with respect to the face of the sheet-metal model, and identifying from the one or more potential weldment features, at least one related pair of weldment features, wherein weldment features of each related pair comprise one of a contacting relationship and crossing relationship with each other.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
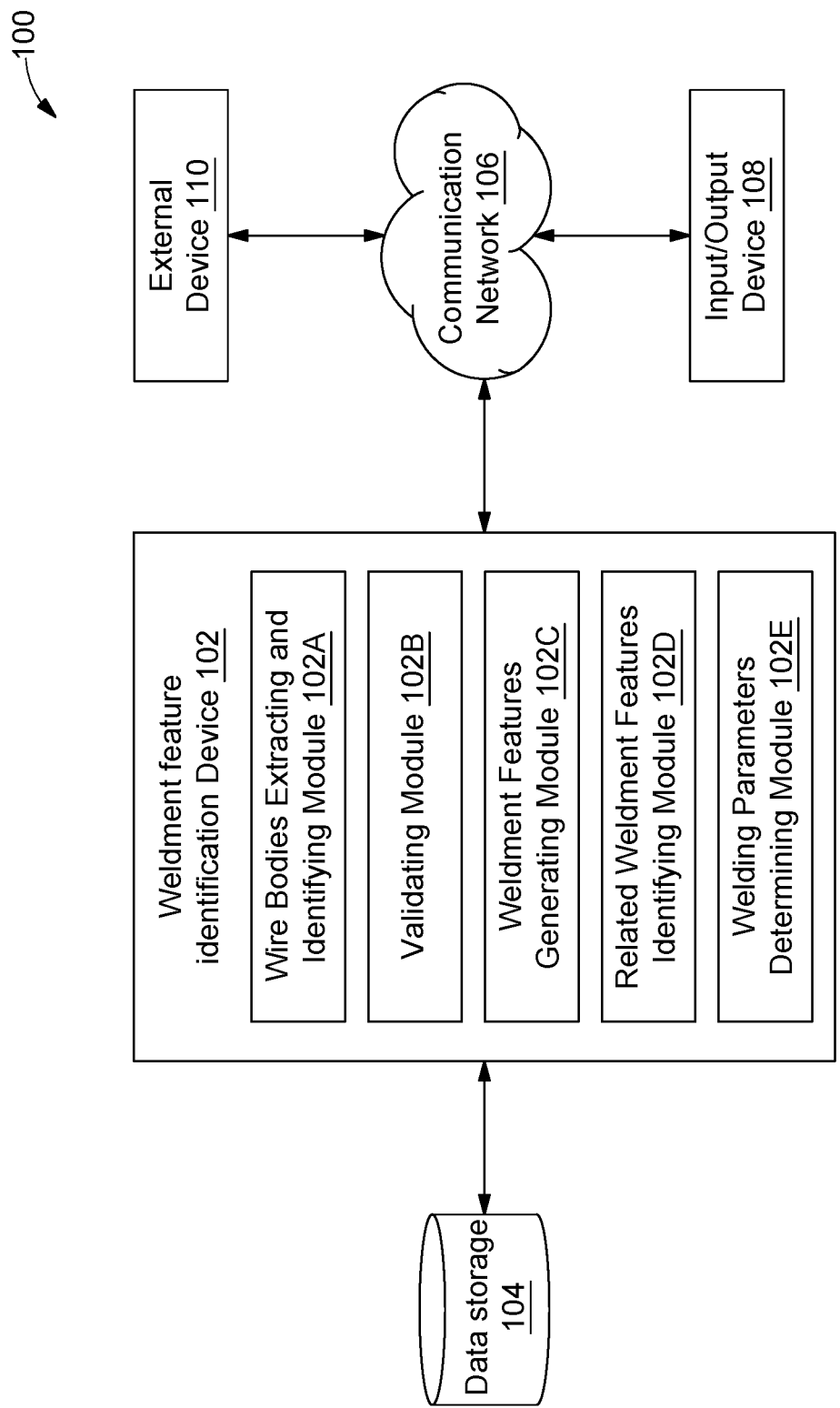
FIG. 1 is a block diagram of an exemplary system for identifying a weldment feature, in accordance with some embodiments of the present disclosure.

Referring now to FIG. 1, a block diagram of an exemplary system 100 for identifying a weldment feature is disclosed, in accordance with some embodiments of the present disclosure. The system 100 may implement a weldment feature identification device 102. Further, the system 100 may include a data storage 104. In some embodiments, the data storage 104 may store a sheet-metal model from which the weldment feature is to be identified. As such, the weldment feature identification device 102 may receive the sheet-metal model from the data storage 104. The weldment feature identification device 102 (or simply an identification device 102) may be a computing device having data processing capability. In particular, the identification device 102 may have the capability for identifying a weldment feature from a sheet-metal model. Examples of the identification device 102 may include, but are not limited to a desktop, a laptop, a notebook, a netbook, a tablet, a smartphone, a mobile phone, an application server, a web server, or the like The system 100 may further include an input/output (I/O) device 108. Examples may include, but are not limited to a display, keypad, microphone, audio speakers, vibrating motor, LED lights, etc. The I/O device 108 may receive input from a user and also display an output of the computation performed by the identification device 102. For example, the user input may include a selection of the sheet-metal model in which the weldment features are to be identified. Further, the display of the I/O device 108 may include a display screen that is capable of displaying the identified weldment features.

Additionally, the identification device 102 may be communicatively coupled to an external device 110 for sending and receiving various data. Examples of the external device 110 may include, but are not limited to, a remote server, digital devices, and a computer system. The identification device 102 may connect to the external device 110 over a communication network 106. The identification device 102 may connect to external device 110 via a wired connection, for example via Universal Serial Bus (USB). A computing device, a smartphone, a mobile device, a laptop, a smartwatch, a personal digital assistant (PDA), an e-reader, and a tablet are all examples of external devices 110.

The identification device 102 may be configured to perform one or more functionalities that may include extracting a plurality of wire bodies from a sheet-metal model, identifying, from the plurality of wire bodies, a set of wire bodies associated with a face of the sheet-metal model, generating one or more potential weldment features from the set of wire-bodies, wherein each of the one or more potential weldment features is analyzed with respect to the face of the sheet-metal model, and identifying, from the one or more potential weldment features, at least one related pair of weldment features, wherein weldment features of each related pair comprise one of a contacting relationship and crossing relationship with each other.

In order to perform the above one or more functionalities, the weldment feature identification device 102 may implement one or more modules including a wire bodies extracting and identifying module 102A, a validating module 102B, a weldment features generating module 102C, a related weldment features identifying module 102D, and a welding parameters determining module 102E.

The wire bodies extracting and identifying module 102A may be configured to extract a plurality of wire bodies from a sheet-metal model. The wire bodies extracting and identifying module 102A may be further configured to identify, from the plurality of wire bodies, a set of wire bodies associated with a face of the sheet-metal model.

In some embodiments, the set of wire bodies associated with the face of the sheet-metal model may be identified based on one or more factors. By way of an example, in order to identify the set of wire bodies associated with the face of the sheet-metal model, the wire bodies extracting and identifying module 102A may discretize the wire-body into a plurality of points, based on a predefined parameter. Further, for a first point of the plurality of points associated with the wire-body, the wire bodies extracting and identifying module 102A may determine a second point on the face of the sheet-metal model closest to the first point. The wire bodies extracting and identifying module 102A may further determine a gap between the first point and the second point. The wire bodies extracting and identifying module 102A may further determine a face normal associated with the second point and a tangent vector associated with the first point.

Further, within a region proximate to the first point, the wire bodies extracting and identifying module 102A may determine a proximate second point on the face of the sheet-metal model closest to the region proximate to the first point, and determine a gap between the region proximate to the first point and the proximate second point. Furthermore, the wire bodies extracting and identifying module 102A may determine a face normal associated with the proximate second point and the tangent vector associated with the region proximate to the first point, and select the set of wire bodies from the plurality of wire-bodies. It should be noted that, the selected set of wire bodies must satisfy the following criteria: (i) the gap between the first point and the second point is less than a predefined gap, (ii) the face normal associated with the second point and the tangent vector associated with the first point is orthogonal, (iii) the gap between the region proximate to the first point and the proximate second point is less than the predefined gap, and (iv) the face normal associated with the proximate second point and the tangent vector associated with the region proximate to the first point is orthogonal.

The validating module 102B may be configured to validate each of the plurality of wire bodies based on one or more validating criteria. By way of an example, the one or more validating criteria may include whether a bounding envelope associated with the wire-body from the plurality of wire bodies is contained or overlapped with a bounding envelope of the sheet-metal model.

Once the set of wire bodies associated with the face of the sheet-metal model is identified and validated, the weldment features generating module 102C may generate one or more potential weldment features from the set of wire-bodies. Each of the one or more potential weldment features may be analyzed with respect to the face of the sheet-metal model.

The related weldment features identifying module 102D may be configured to identify at least one related pair of weldment features from the one or more potential weldment features. It should be noted that the weldment features of each related pair may include one of a contacting relationship and crossing relationship with each other. In some embodiments, the contacting relationship may be based on a bounding envelope associated with a weldment feature of the related pair of weldment features is intersecting or contained with a bounding envelope associated with the other weldment feature of the pair of weldment features. Further, each weldment feature of the related pair of weldment features may include end-to-end connectivity. In some embodiments, the crossing relationship may be based on a bounding envelope associated with a weldment feature of the related pair of weldment features is intersecting or contained with a bounding envelope associated with the other weldment feature of the pair of weldment features. Further, each weldment feature of the related pair of weldment features crosses or touches the other weldment feature at an associated point.

The welding parameters determining module 102E may be configured to determine one or more welding parameters for performing welding operation based on the at least one related pair of weldment features. For example, the one or more welding parameters may include a face of the sheet-metal body associated with each weldment feature of the at least one related pair of weldment features, and a shape associated with each weldment feature of the at least one related pair of weldment features. For example, the shape may be a straight line, a circle, an ellipse, or a spline. The one or more welding parameters may further include a length of each weldment feature of the at least one related pair of weldment features. The one or more welding parameters may further include a starting point, a middle point, and an end point associated with each weldment feature of the at least one related pair of weldment features. In short, once the weldment features are identified, the welding parameters determining module 102E may determine the one or more parameters for planning the welding operations to be performed for the manufacturing of the sheet metal model.

Figure 2A:
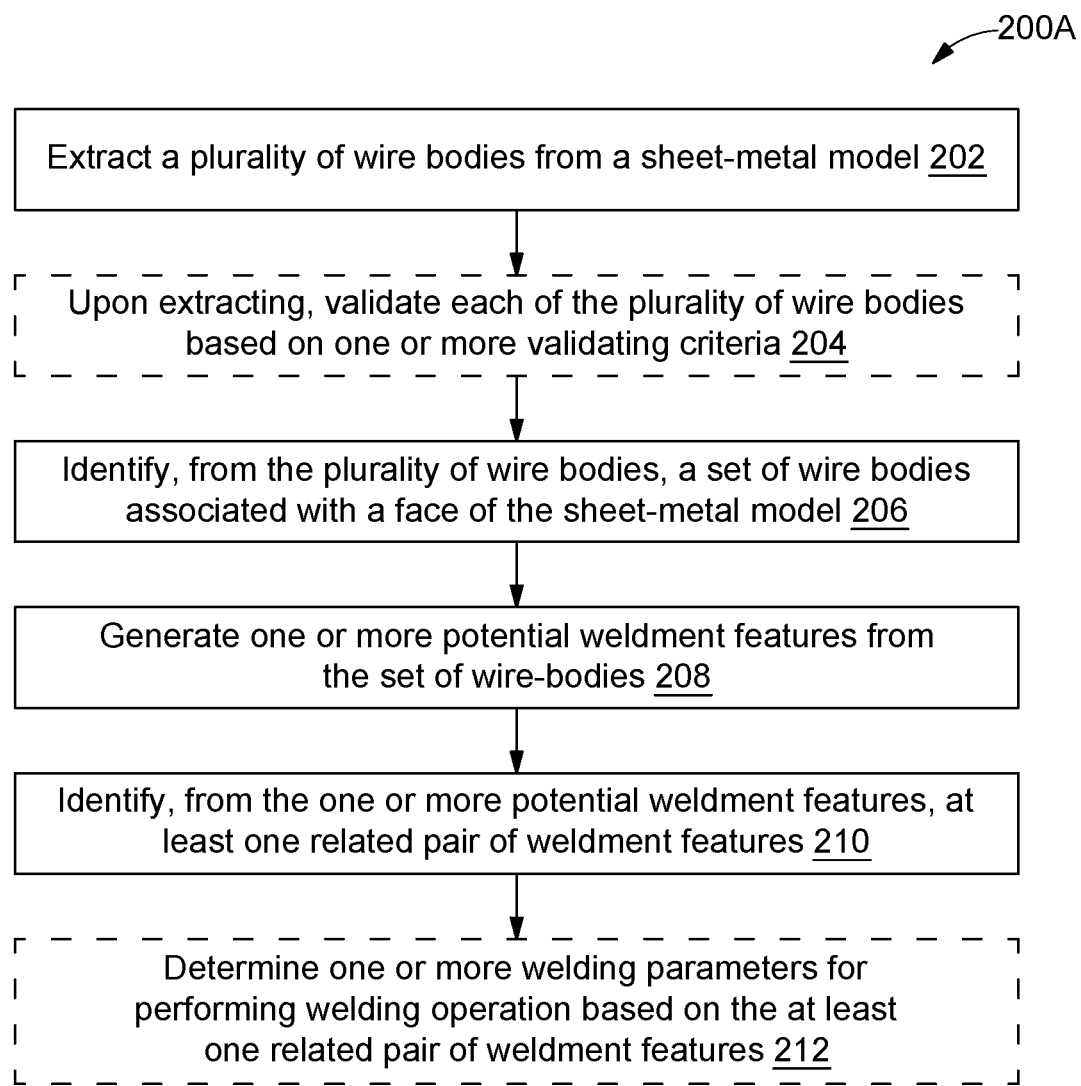
FIG. 2A illustrates a flowchart of a method of identifying a weldment feature, in accordance some an embodiment.

Referring now to FIG. 2A, a flowchart of a method 200A of identifying a weldment feature is illustrated, in accordance some an embodiment. For example, the method 200A may be performed by the weldment feature identification device 102, as discussed above.

At step 202, a plurality of wire bodies may be extracted from a sheet-metal model. As already mentioned above and as will be appreciated by those skilled in the art, a wire body (also, referred to as pure wire body) includes edges and vertices; however, does not include faces. In other words, the wire body is a topologically one-dimensional body. The wire body may include a single edge or a set of connected edges. Further, the wire body may represent open profiles or closed profiles.

As will be further appreciated, sheet-metal models are created by sheet metal operations like bending, punching, etc. For example, the sheet-metal models may be characterized by a uniform thickness throughout. The sheet-metal models may mainly include elements like walls, bends, form, and stamp elements. Computer-based (digital) representations of physical sheet-metal models may be provided using various available techniques, such as Boundary Representation, also commonly referred to as B-rep. The B-rep model of the sheet-metal model may include a set of "faces", "edges", and "vertices" connected to form a topological structure of a part. The data associated with the B-rep model may be stored in a graph structure. For example, in such graph structures, each node represents a face, and each link/connection represents an edge. Further, using the B-rep model allows evaluation of different properties of the part. These properties may include mass, volume, moments of inertia, and products of inertia associated with the part. Additionally, the B-rep model enables a computer-based analysis of stress and strains in part under different loading conditions. Further, the B-rep model can also be "cut" and examined in a manner like an actual part. For these reasons, the B-rep model may also be known as a solid model or a sheet-metal model. Various solid modeling software are used to create sheet-metal models that are intended to eventually be manufactured. For example, some of the solid modeling software include SOLIDWorks, Catia (Dassault Systems), Creo Parametric (PTC), etc.

As will be further appreciated, a weldment is joining of two different parts by welding process. The joining of two different parts may also include touching or near-touching of regions in the parts. The present disclosure provides for recognizing weldment features (also referred to as sketch features) from a wire body, and their associativity with the sheet-metal model. In order to recognize the weldment features from the wire body, relationships between different weldment features like, crossing, contacting, etc. may be determined. This is explained in conjunction with FIG. 3.

Figure 3:
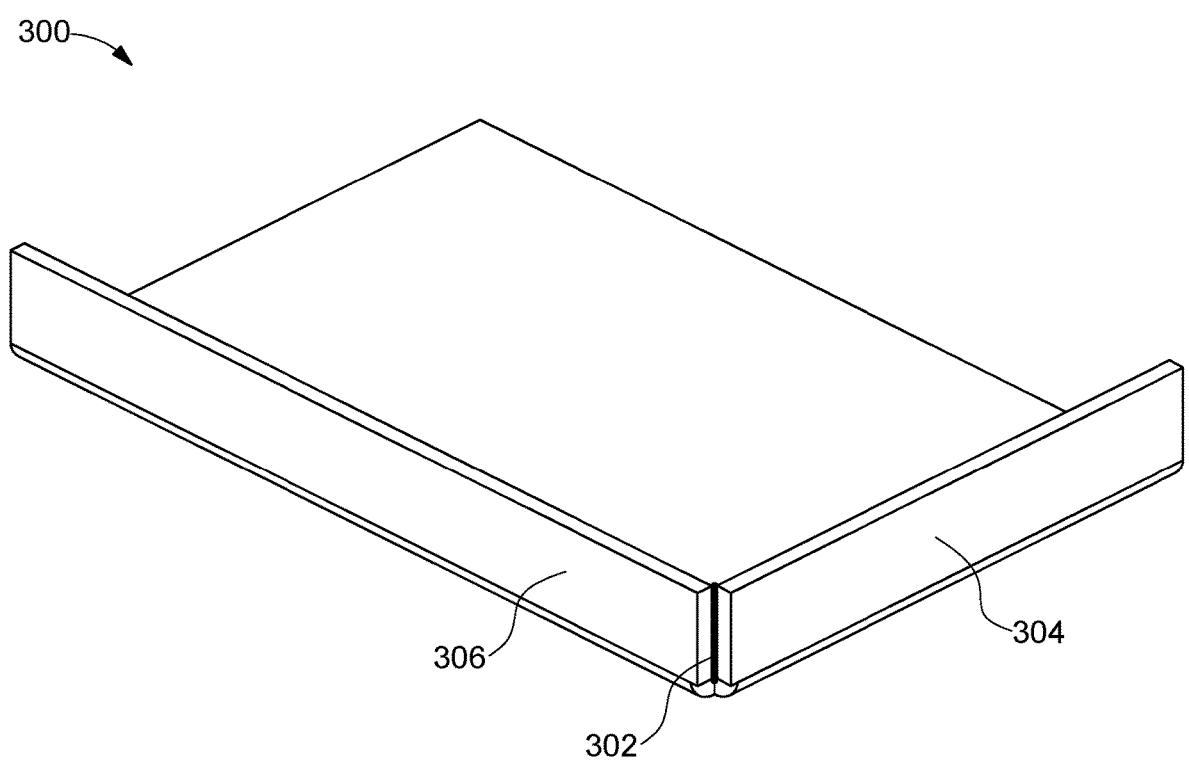
FIG. 3 illustrates a perspective view of a wire body, in accordance with some embodiments.

Referring now to FIG. 3, a perspective view 300 of a wire body is illustrated, in accordance with some embodiments. As shown in FIG. 3, a marking line 302 may be recognized as the weldment feature. In other words, the marking line may indicate a need for a weldment for joining a first part 304 and a second part 306. The marking line 302 may be recognized as the weldment feature, if the wire body is associated with a sheet-metal model. As will be discussed in detail in the subsequent sections of this disclosure, the weldment feature may be associated with one or more parameters including a relationship feature (e.g. contacting and crossing), an associated face on the sheet-metal model, a length, a shape type, a start position, a mid-position, and an end position of weldment feature.

Returning to FIG. 2A, at step 204, upon extracting the plurality of wire bodies from the sheet-metal model, each of the plurality of wire bodies may be validated based on one or more validating criteria. In some embodiments, the one or more validating criteria may include whether a bounding envelope associated with the wire-body from the plurality of wire bodies is contained or overlapped with a bounding envelope of the sheet-metal model. Additionally, in some embodiments, the one or more validating criteria may include whether the wire-body is associated with a hole tapping. This is further explained in conjunction with FIGS. 4-8.

Figure 4:
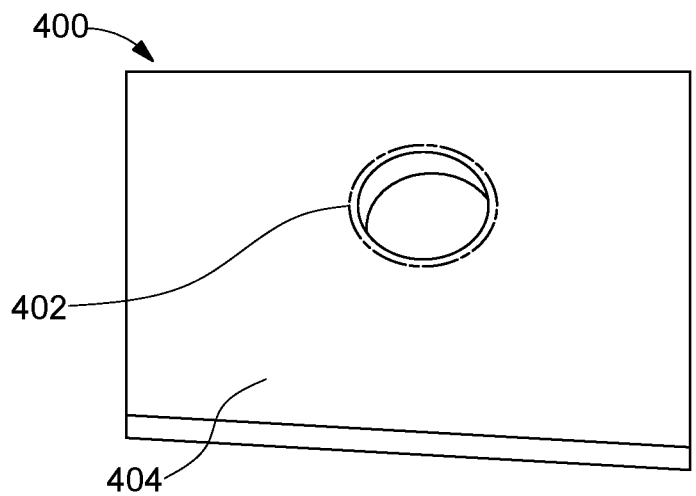
FIGS. 4-9 illustrate perspective views of different example wire bodies and sheet-metal faces, in accordance with some embodiments.
Figure 5:
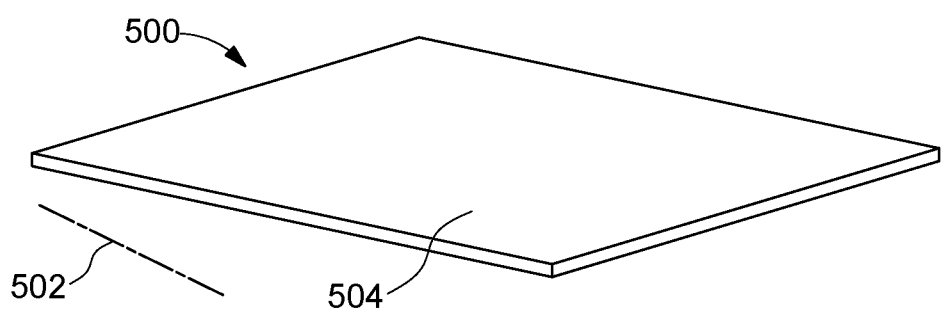

Referring now to FIGS. 4-8, perspective views 400-800 of different example wire bodies and their corresponding sheet-metal faces are illustrated, in accordance with some embodiments. As shown in FIG. 4, the view 400 includes a wire body 402 and a sheet-metal face 404. Similarly, as shown in FIG. 5, the view 500 includes a wire body 502 and a sheet-metal face 504, the view 600 includes a wire body 602 and a sheet-metal face 604, the view 700 includes a wire body 702 and a sheet-metal face 704, and the view 800 includes a wire body 802 and a sheet-metal face 804.

In order to identify the weldment feature, each of the wire bodies 402, 502, 602, 702, 802 is validated based on the one or more validation criteria. As mentioned above, one validating criteria may include whether a bounding envelope associated with the wire-body from the plurality of wire bodies is contained or overlapped with a bounding envelope of the sheet-metal model, and another validating criteria may include determining whether the wire-body is associated with a hole tapping.

When the wire body 402 is analyzed against the criteria of determining whether the wire-body is associated with a hole tapping, the wire-body does not meet this criteria, as the wire body 402 is associated with the hole tapping. Therefore, the wire body 402 may be held invalid. It may be noted that a wire-body having a circular profile may be possibly associated with a hole tapping. Further, when the remaining of the wire bodies 502, 602, 702, 802 are analyzed against the criteria of determining whether the wire-body is associated with a hole tapping, the wire bodies 502, 602, 702, 802 are found to be not associated with a hole tapping. As such, the wire bodies 502, 602, 702, 802 may be held valid with respect to the validating criteria of whether the wire-body is associated with a hole tapping. The wire body 402 may be rejected and not considered for any further analysis for identifying the weldment feature, and only the remaining of the wire bodies 502, 602, 702, 802 may be further analyzed.

When the wire body 502 is analyzed against the validating criteria of determining whether a bounding envelope associated with the wire-body 502 is contained or overlapped with a bounding envelope of the sheet-metal model, the wire body 502 may be found to be invalid. As can be seen, the bounding envelope associated with the wire-body 502 is neither contained nor overlapped with a bounding envelope of the sheet-metal model. The wire body 502 may be therefore rejected and not considered for any further analysis for identifying the weldment feature.

When the wire body 602 is analyzed against the criteria of whether a bounding envelope associated with the wire-body 602 is contained or overlapped with a bounding envelope of the corresponding sheet-metal model (face) 604, the wire body 602 may found to be valid. This is because the bounding envelope associated with the wire-body 602 is intersecting the corresponding sheet-metal model (face) 604, and therefore, overlapped with the bounding envelope of the corresponding sheet-metal model (face) 604. The wire body 602 may be therefore considered for further analysis for identifying the weldment feature.

Further, when the wire body 702 is analyzed against the criteria of whether a bounding envelope associated with the wire-body 702 is contained or overlapped with a bounding envelope of the corresponding sheet-metal model (face) 704, the wire body 702 may also found to be valid. This is because the bounding envelope associated with the wire-body 702 is contained and overlapped with the bounding envelope of the corresponding sheet-metal model (face) 704. The wire body 702 may also be therefore considered for further analysis for identifying the weldment feature.

Further, when the wire body 802 is analyzed against the criteria of whether a bounding envelope associated with the wire-body 802 is contained or overlapped with a bounding envelope of the corresponding sheet-metal model (face) 804, the wire body 802 may also found to be valid. This is because the bounding envelope associated with the wire-body 802 is overlapped with the bounding envelope of the corresponding sheet-metal model (face) 804. The wire body 802 may also be therefore considered for further analysis for identifying the weldment feature.

Returning to FIG. 2A, at step 206, a set of wire bodies associated with a face of the sheet-metal model may be identified from the plurality of wire bodies. In order to qualify as a wire body associated with a face of the sheet-metal model, the wire body must be laid on the face of the sheet-metal model to be associated with that face. In other words, only a wire body which is laid on the face of the sheet-metal model may be considered as associated with the face of the sheet-metal model. This is further explained in conjunction with FIG. 2B and 9-11.

Figure 2B:
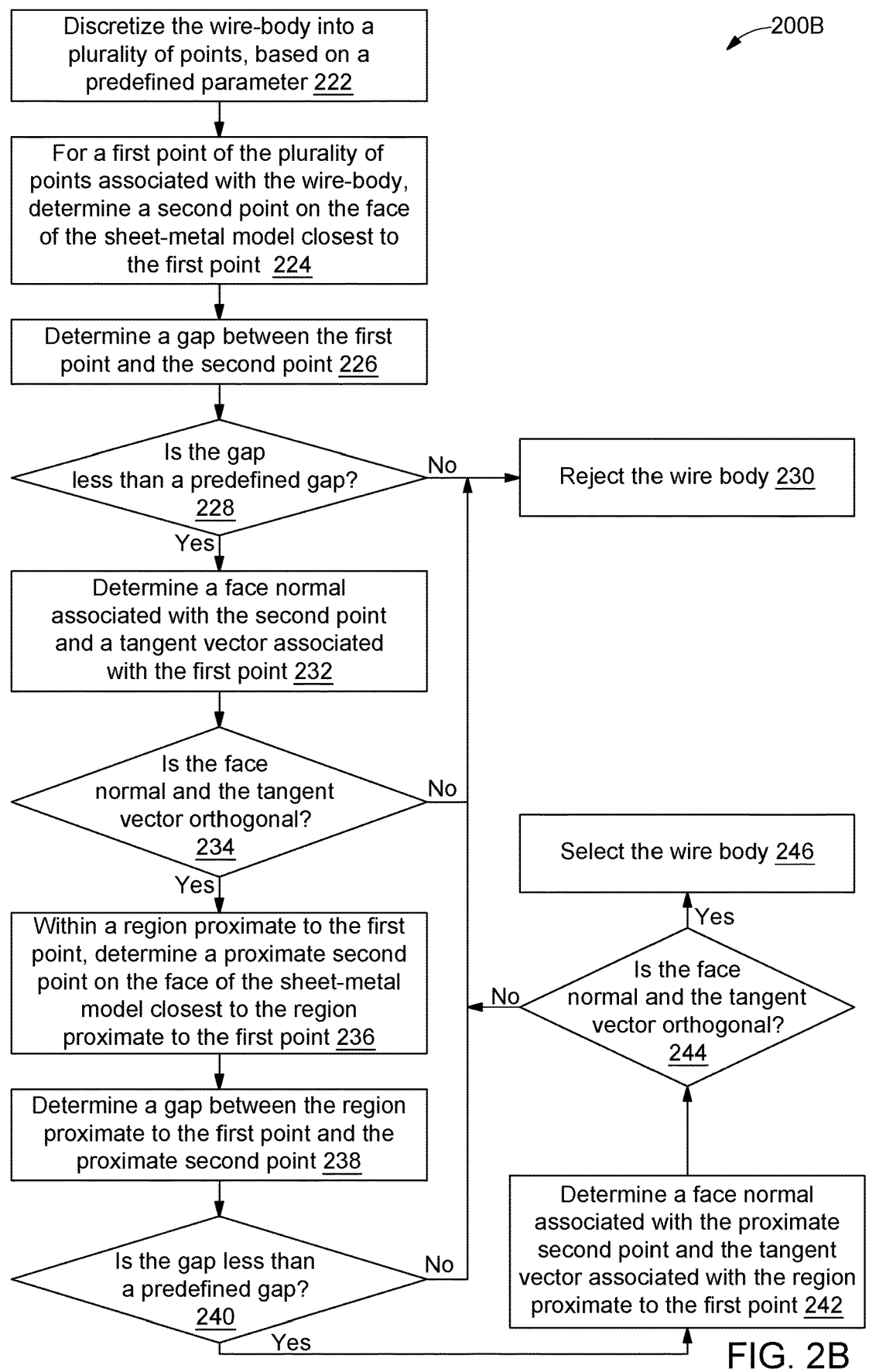
FIG. 2B illustrates a flowchart of a method of identifying a set of wire bodies associated with a face of the sheet-metal model, in accordance with some embodiments.

Referring now to FIG. 2B, a flowchart of a method 200B of identifying a set of wire bodies associated with a face of the sheet-metal model is illustrated in accordance with some embodiments. The method 200B may be performed as part of step 206 of the method 200A.

At step 222, the wire-body may be discretized into a plurality of points, based on a predefined parameter. The predefined parameter may be an internally defined parameter. For example, the predefined parameter may include a predefined length between two adjacent points of the wire-body. At step 224, a first point may be selected from the plurality of points. Further, for the first point of the plurality of points associated with the wire-body, a second point may be determined on the face of the sheet-metal model closest to the first point. At step 226, a gap between the first point and the second point may be determined. At step 228, a check may be performed to determine if the gap between the first point and the second point is less than a predefined gap. The steps 222-228 are further explained via an example scenario in conjunction with FIG. 9.

Figure 9:
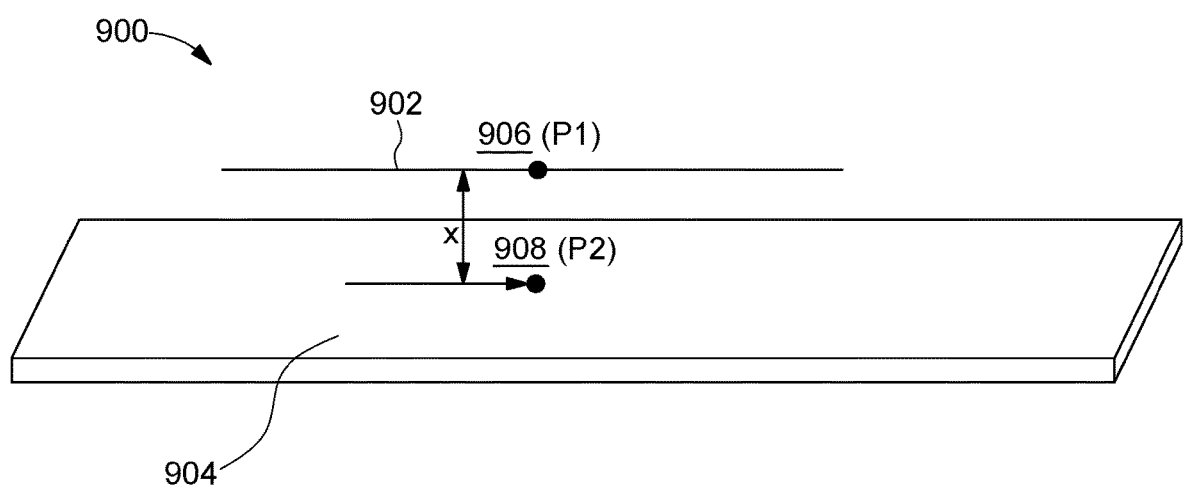

Referring now to FIG. 9, a perspective view 900 of an example wire-body 902 and a sheet-metal face 904 is shown in accordance with some embodiments. In order to determine whether the wire body 902 is associated with the face 904 of the sheet-metal model, first the wire-body 902 is discretized into a plurality of points. Further, as shown in FIG. 9, a first point 906(P1) is selected from the plurality of points. Further, for the first point 906(P1) associated with the wire-body 902, a second point 908(P2) on the face 904 of the sheet-metal model is determined, such that the second point 908(P2) is closest to the first point 906(P1). Furthermore, a gap (X) between the first point 906(P1) and the second point 908(P2) is determined. Thereafter, it is checked whether this gap (X) between the first point 906(P1) and the second point 908(P2) is less than a predetermined gap or not. If the gap (X) between the first point 906(P1) and the second point 908(P2) is less than the predefined gap, the wire-body 902 may be further analyzed in order to be associated with the face 904 of the sheet-metal model. However, if the gap (X) between the first point 906(P1) and the second point 908(P2) is not less than the predefined gap, the wire-body 902 may be rejected and may not further analyzed.

Returning to FIG. 2, at step 228, if it is determined that the gap between the first point 906(P1) and the second point 908(P2) is not less than the predefined gap, the method 200B may proceed to step 230 ("No path"). At step 230, the wire body may be rejected. However, at step 228, if it is determined that the gap between the first point 906(P1) and the second point 908(P2) is less than the predefined gap, the method may proceed to step 232 ("Yes path").

At step 232, a face normal associated with the second point and a tangent vector associated with the first point may be determined. At step 234, a check may be performed to determine if the face normal and the tangent vector are orthogonal. This is further explained via examples scenarios of FIGS. 10-11.

Figure 6:
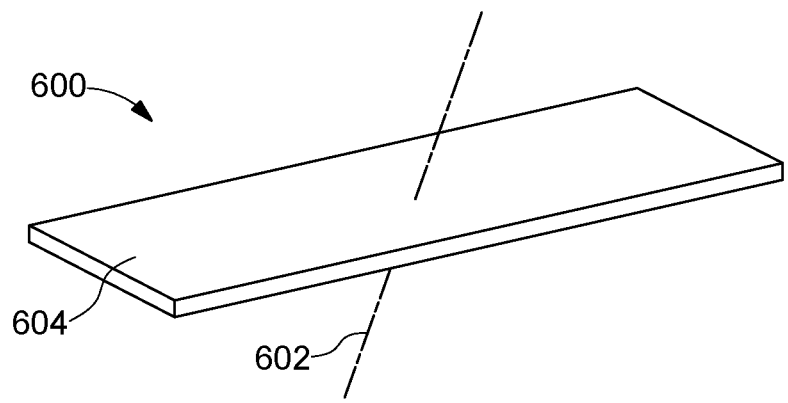
Figure 10:
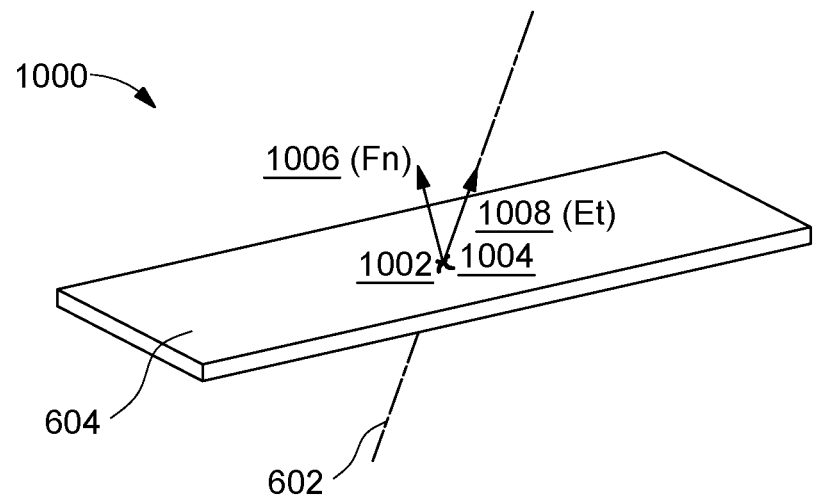
FIG. 10 illustrates another perspective view of the wire body and sheet-metal face of FIG. 6, in accordance with some embodiments.

Referring now to FIG. 10, the perspective view 1000 including the wire-body 602 and the sheet-metal face 604 are illustrated, corresponding to FIG. 6, in accordance with an embodiment. As already discussed before, the wire-body 602 is found to be valid against the one or more validation criteria, i.e. whether a bounding envelope associated with the wire-body from the plurality of wire bodies is contained or overlapped with a bounding envelope of the sheet-metal model, and whether the wire-body is associated with a hole tapping. It should be noted that once the wire-body is held valid, the wire-body may be further analyzed for checking if wire-body is associated with a face of the sheet-metal model. To this end, a first point 1002 which is a discretized point of the wire-body 602 is selected. Further, a second point 1004 which is a point on the sheet-metal face 604 closest to the point 1002 of the wire-body 602 is selected. Further, a face normal 1006(Fn) associated with the second point 1004 and a tangent vector 1008(Et) associated with the first point 1002 is determined. Furthermore, it is checked whether the face normal 1006(Fn) associated with the second point 1004 and the tangent vector 1008(Et) associated with the first point 1002 are orthogonal to each other. As will be understood and can be seen in FIG. 10, the face normal 1006(Fn) and the tangent vector 1008(Et) are not found to be orthogonal. As such, the wire-body 602 is rejected, and therefore not analyzed for further processing.

Figure 7:
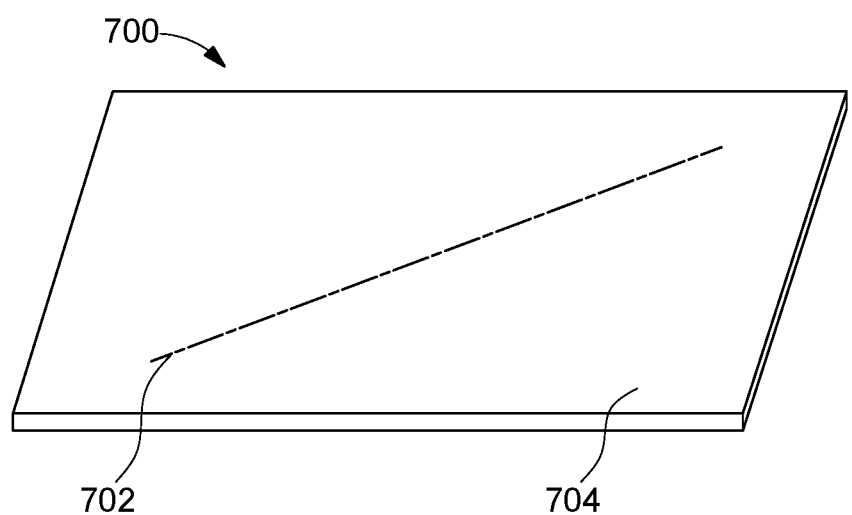
Figure 11:
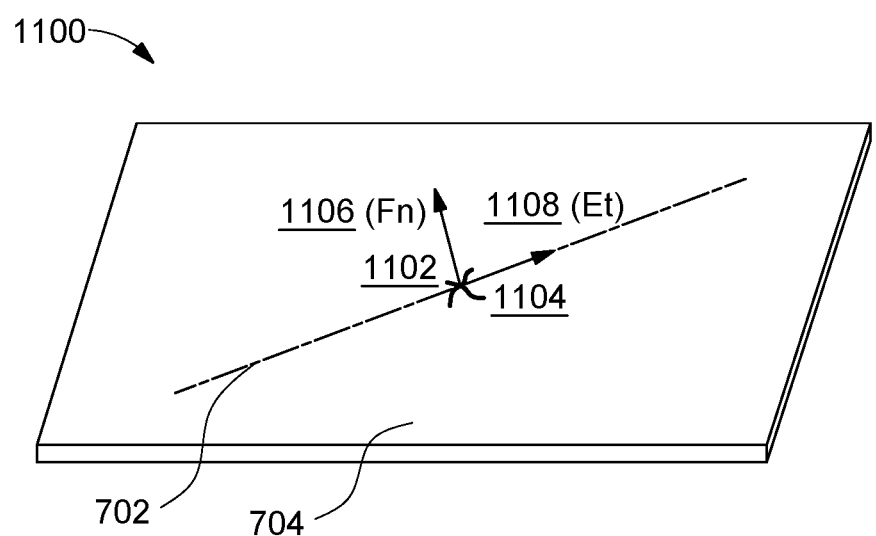
FIG. 11 illustrates another perspective view of the wire body and sheet-metal face of FIG. 7, in accordance with some embodiments.

Referring now to FIG. 11, a perspective view 1100 including the wire-body 702 and the sheet-metal face 704 are illustrated, corresponding to FIG. 7, in accordance with another embodiment. As already discussed before, the wire-body 702 is found to be valid against the above one or more validation criteria. Therefore, the wire-body 702 is further analyzed for checking if wire-body is associated with a face of the sheet-metal model. To this end, as explained above, a first point 1102 which is a discretized point of the wire-body 702 and a second point 1104 which is a point on the sheet-metal face 704 closest to the point 1102 of the wire-body 702 are selected. Further, a face normal 1106(Fn) associated with the second point 1104 and a tangent vector 1108(Et) associated with the first point 1102 is determined. Thereafter, it is checked whether the face normal 1106(Fn) associated with the second point 1104 and the tangent vector 1108(Et) associated with the first point 1102 are orthogonal to each other. As will be understood and can be seen in FIG. 11, the face normal 1106(Fn) and the tangent vector 1108(Et) are orthogonal to each other. As such, the wire-body 702 may be selected, and therefore further analyzed.

Figure 8:
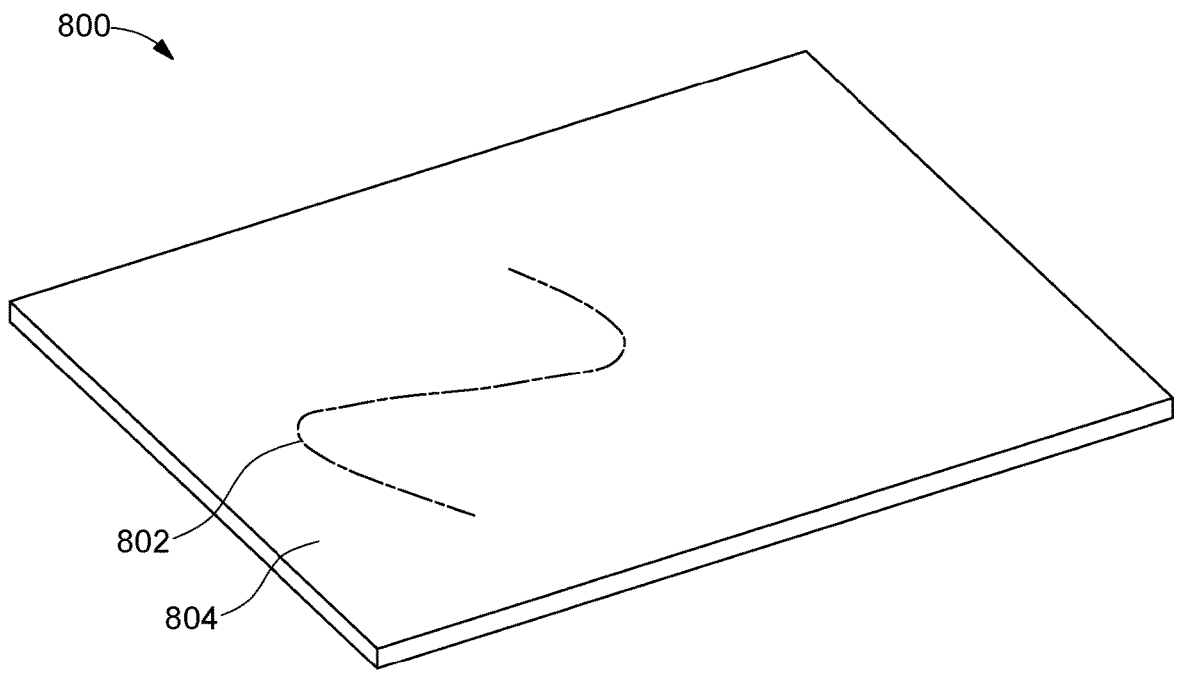

It should be noted that on similar grounds, the wire-body 802 of FIG. 8 may also be also found to be valid. Further, the wire-body 802 of FIG. 8 may also be found to be associated with the sheet-metal face 804.

Returning to FIG. 2B, at step 234, if it is determined that the face normal associated with the second point and the tangent vector associated with the first point is not orthogonal, the method 200B may proceed to step 230 ("No" path) where the wire-body may be rejected. However, if at step 234, it is determined that the face normal associated with the second point and the tangent vector associated with the first point is orthogonal, the method 200B may proceed to step 236 ("Yes" path).

At step 236, within a region proximate to the first point, a proximate second point on the face of the sheet-metal model closest to the region proximate to the first point may be determined. At step 238, a gap between the region proximate to the first point and the proximate second point may be determined. At step 240, a check may be performed to determine if the gap between the region proximate to the first point and the proximate second point is less than a predetermined gap. If at step 240, it is determined that the gap between the region proximate to the first point and the proximate second point is not less than the predetermined gap, the method 200B may once again proceed to step 230 ("No" path), at which the wire-body may be rejected as not being associated with a sheet-metal face. However, if at step 240, it is determined that the gap between the region proximate to the first point and the proximate second point is less than the predetermined gap, the method 200B may proceed to step 242 ("Yes" path).

At step 242, a face normal associated with the proximate second point and a tangent vector associated with the region proximate to the first point may be determined. At step 244, a check may be performed to determine if the face normal associated with the proximate second point and the tangent vector associated with the region proximate to the first point is orthogonal or not. If at step 244, it is determined that the face normal associated with the proximate second point and the tangent vector associated with the region proximate to the first point is not orthogonal, the method 200B may again proceed to step 230 ("No" path), at which the wire-body may be rejected, as not being associated with a sheet-metal face. However, if at step 244, it is determined that the face normal associated with the proximate second point and the tangent vector associated with the region proximate to the first point is orthogonal, the method 200B may proceed to step 246 ("Yes" path). At step 246, the wire-body may be selected, i.e. the wire-body may be identified to be associated with the face of the sheet-metal model.

Therefore, in a nutshell, for a valid wire-body (validated at step 204 of method 200A) to be identified to be associated with a face of the sheet-metal model, the wire-body may satisfy the following criteria—(i) that the gap between the first point and the second point is less than a predefined gap; (ii) that the face normal associated with the second point and the tangent vector associated with the first point is orthogonal; (iii) that the gap between the region proximate to the first point and the proximate second point is less than the predefined gap; and (iv) that the face normal associated with the proximate second point and the tangent vector associated with the region proximate to the first point is orthogonal.

Referring now back to FIG. 2A, once the set of wire bodies associated with a face of the sheet-metal model are identified, then, at step 208, one or more potential weldment features may be generated from the set of wire-bodies. Each of the one or more potential weldment features may be analyzed with respect to the face of the sheet-metal model. As such, the one or more potential weldment features may be generated from the valid wire-bodies which are associated with a face of sheet-metal model.

At step 210, at least one related pair of weldment features may be identified from the one or more potential weldment features. The weldment features of each related pair may include one of a contacting relationship and crossing relationship with each other. The contacting relationship and crossing relationship are further explained in conjunction with FIGS. 12-13, respectively.

Figure 12:
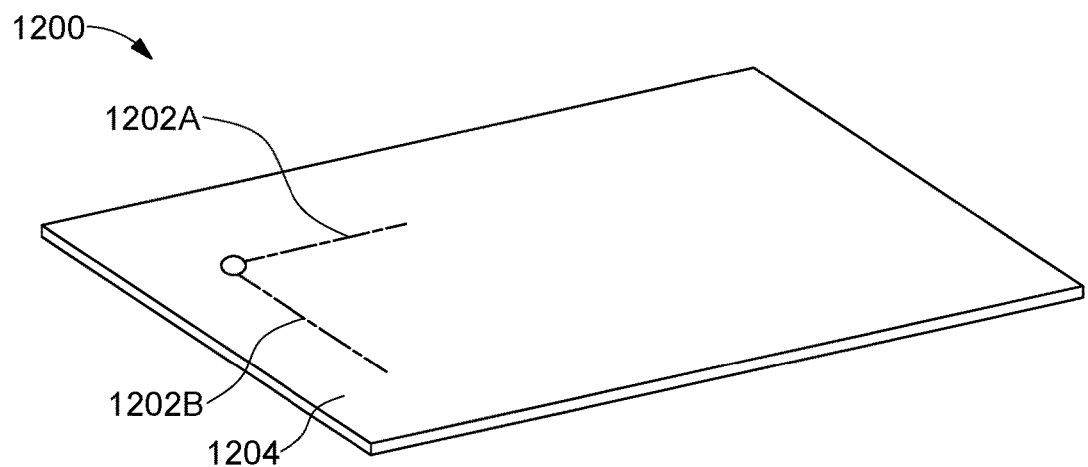
FIGS. 12-13 illustrate perspective views of a pair of weldment features and a sheet-metal face respectively, in accordance with some example embodiments.

Referring now to FIG. 12, a perspective view 1200 of a pair of weldment features 1202A, 1202B and a sheet-metal face 1204 are illustrated in accordance with an example embodiment. In order to be identified as a related pair of weldment features, the pair of potential weldment features may have a contacting relationship or a crossing relationship.

It should be noted that the contacting relationship may be based on a bounding envelope associated with a weldment feature of the related pair of weldment features is intersecting or contained with a bounding envelope associated with the other weldment feature of the pair of weldment features, and each weldment feature of the related pair of weldment features comprises end-to-end connectivity. As shown in FIG. 12, a bounding envelope associated with the weldment feature 1202A is contained with a bounding envelope associated with the other weldment feature 1202B (of the pair of weldment features 1202A, 1202B). Further, each of the weldment feature 1202A and the weldment feature 1202B includes an end-to-end connectivity. In other words, the weldment feature 1202A is contacting feature for the weldment feature 1202B and vice versa as they have end-to-end connectivity. Therefore, the pair of potential weldment features 1202A, 1202B are identified as a related pair of weldment features, for having a contacting relationship.

Figure 13:
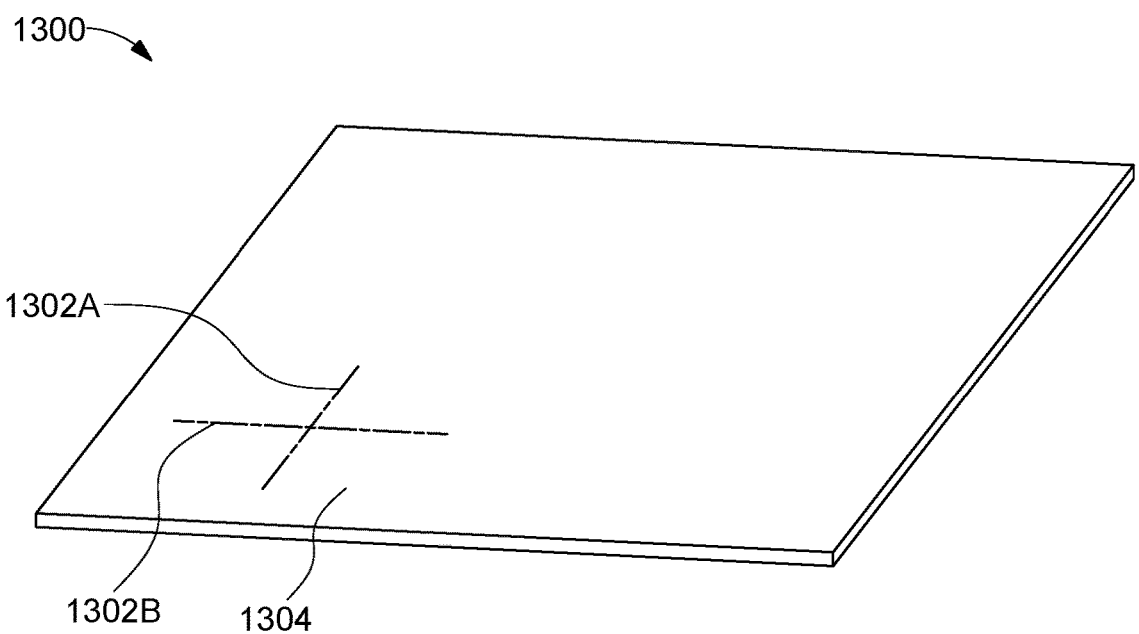

Referring now to FIG. 13, a perspective view 1300 of a pair of weldment features 1302A, 1302B and a sheet-metal face 1304 are illustrated in accordance with an example embodiment. As mentioned above, in order to be identified as a related pair of weldment features, a pair of potential weldment features may have a contacting relationship or a crossing relationship.

It should be noted that the crossing relationship may be based on a bounding envelope associated with a weldment feature of the related pair of weldment features is intersecting or contained with a bounding envelope associated with the other weldment feature of the pair of weldment features, and each weldment feature of the related pair of weldment features crosses or touches the other weldment feature at an associated point. As shown in FIG. 13, a bounding envelope associated with the weldment feature 1302A is intersecting with a bounding envelope associated with the other weldment feature 1302B (of the pair of weldment features 1302A, 1302B). Further, each of the weldment feature 1302A and the weldment feature 1302B includes crosses or touches the other weldment feature at an associated point. Therefore, the pair of potential weldment features 1302A, 1302B are identified as a related pair of weldment features, for having a contacting relationship.

Returning to FIG. 2A, at step 212, one or more welding parameters for performing welding operation may be determined based on the at least one related pair of weldment features. For example, the one or more welding parameters may include a face of the sheet-metal body associated with each weldment feature of the at least one related pair of weldment features, and a shape associated with each weldment feature of the at least one related pair of weldment features. For example, the shape may be a straight line, a circle, an ellipse, or a spline. The one or more welding parameters may further include a length of each weldment feature of the at least one related pair of weldment features. The one or more welding parameters may further include a starting point, a middle point, and an end point associated with each weldment feature of the at least one related pair of weldment features. In short, the one or more parameters for planning the welding operations to be performed for the manufacturing of the sheet metal model may be determined.

Figure 14:
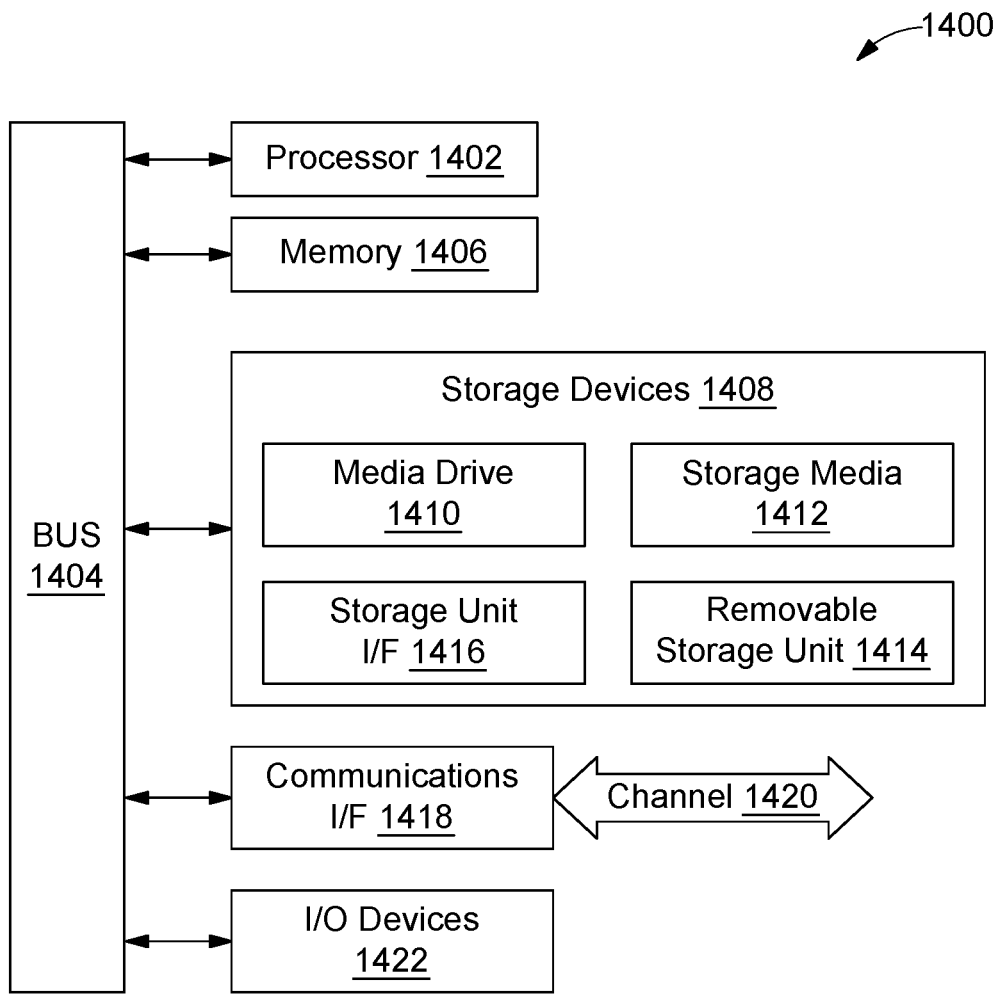
FIG. 14 is an exemplary system for performing functionalities of identifying a weldment feature, in accordance with some embodiments.

Referring now to FIG. 14, an exemplary computing system 1400 that may be employed to implement processing functionality for various embodiments (e.g., as a SIMD device, client device, server device, one or more processors, or the like) is illustrated. Those skilled in the relevant art will also recognize how to implement the invention using other computer systems or architectures. The computing system 1400 may represent, for example, a user device such as a desktop, a laptop, a mobile phone, personal entertainment device, DVR, and so on, or any other type of special or general-purpose computing device as may be desirable or appropriate for a given application or environment. The computing system 1400 may include one or more processors, such as a processor 1402 that may be implemented using a general or special purpose processing engine such as, for example, a microprocessor, microcontroller or other control logic. In this example, the processor 1402 is connected to a bus 1404 or other communication media. In some embodiments, the processor 1402 may be an Artificial Intelligence (AI) processor, which may be implemented as a Tensor Processing Unit (TPU), or a graphical processor unit, or a custom programmable solution Field-Programmable Gate Array (FPGA).

The computing system 1400 may also include a memory 1406 (main memory), for example, Random Access Memory (RAM) or other dynamic memory, for storing information and instructions to be executed by the processor 1402. The memory 1406 also may be used for storing temporary variables or other intermediate information during the execution of instructions to be executed by processor 1402. The computing system 1400 may likewise include a read-only memory ("ROM") or other static storage device coupled to bus 1404 for storing static information and instructions for the processor 1402.

The computing system 1400 may also include storage devices 1408, which may include, for example, a media drive 14140 and a removable storage interface. The media drive 14140 may include a drive or other mechanism to support fixed or removable storage media, such as a hard disk drive, a floppy disk drive, a magnetic tape drive, an SD card port, a USB port, a micro-USB, an optical disk drive, a CD or DVD drive (R or RW), or other removable or fixed media drive. A storage media 14142 may include, for example, a hard disk, magnetic tape, flash drive, or other fixed or removable media that is read by and written to by the media drive 14140. As these examples illustrate, the storage media 14142 may include a computer-readable storage medium having stored therein particular computer software or data.

In alternative embodiments, the storage devices 1408 may include other similar instrumentalities for allowing computer programs or other instructions or data to be loaded into the computing system 1400. Such instrumentalities may include, for example, a removable storage unit 1414 and a storage unit interface 1416, such as a program cartridge and cartridge interface, a removable memory (for example, a flash memory or other removable memory module) and memory slot, and other removable storage units and interfaces that allow software and data to be transferred from the removable storage unit 1414 to the computing system 1400.

The computing system 1400 may also include a communications interface 1418. The communications interface 1418 may be used to allow software and data to be transferred between the computing system 1400 and external devices. Examples of the communications interface 1418 may include a network interface (such as an Ethernet or other NIC card), a communications port (such as for example, a USB port, a micro-USB port), Near field Communication (NFC), etc. Software and data transferred via the communications interface 1418 are in the form of signals which may be electronic, electromagnetic, optical, or other signals capable of being received by the communications interface 1418. These signals are provided to the communications interface 1418 via a channel 1420. The channel 1420 may carry signals and may be implemented using a wireless medium, wire or cable, fiber optics, or other communications medium. Some examples of the channel 1420 may include a phone line, a cellular phone link, an RF link, a Bluetooth link, a network interface, a local or wide area network, and other communications channels.

The computing system 1400 may further include Input/Output (I/O) devices 1422. Examples may include, but are not limited to a display, keypad, microphone, audio speakers, vibrating motor, LED lights, etc. The I/O devices 1422 may receive input from a user and also display an output of the computation performed by the processor 1402. In this document, the terms "computer program product" and "computer-readable medium" may be used generally to refer to media such as, for example, the memory 1406, the storage devices 1408, the removable storage unit 1414, or signal(s) on the channel 1420. These and other forms of computer-readable media may be involved in providing one or more sequences of one or more instructions to the processor 1402 for execution. Such instructions, generally referred to as "computer program code" (which may be grouped in the form of computer programs or other groupings), when executed, enable the computing system 1400 to perform features or functions of embodiments of the present invention.

In an embodiment where the elements are implemented using software, the software may be stored in a computer-readable medium and loaded into the computing system 1400 using, for example, the removable storage unit 1414, the media drive 14140 or the communications interface 1418. The control logic (in this example, software instructions or computer program code), when executed by the processor 1402, causes the processor 1402 to perform the functions of the invention as described herein.

One or more techniques for identifying weldment features in sheet-metal models are described above. The above techniques provide for various computer-based methodologies for identifying features from the sheet-metal models that may correspond to weldments, i.e. require welding operation during manufacturing. As such, the above techniques provide for a time-efficient and an accurate solution for identifying the possible weldment features, thereby allowing for advance planning of the welding operations. The identified weldment features can be used to determine the welding path, assemble the parts, and mark the sheet-metal tooling operation. Further, the above techniques are applicable in various domains like structural, fabrication, automobile, and aerospace industries.

It is intended that the disclosure and examples be considered as exemplary only, with a true scope and spirit of disclosed embodiments being indicated by the following claims.

We claim:

1. A method of identifying a weldment feature, the method comprising:
    extracting, by an identifying device, a plurality of wire bodies from a sheet-metal model;
    identifying, by the identifying device, from the plurality of wire bodies, a set of wire bodies associated with a face of the sheet-metal model, wherein the set of wire bodies associated with the face of the sheet-metal model is identified based on:
        discretizing the wire-body into a plurality of points, based on a predefined parameter;
        for a first point of the plurality of points associated with the wire-body, determining a second point on the face of the sheet-metal model closest to the first point;
        determining a gap between the first point and the second point;
        determining a face normal associated with the second point and a tangent vector associated with the first point;
        within a region proximate to the first point, determining a proximate second point on the face of the sheet-metal model closest to the region proximate to the first point;
        determining a gap between the region proximate to the first point and the proximate second point;
        determining a face normal associated with the proximate second point and a tangent vector associated with the region proximate to the first point; and;
    generating, by the identifying device, one or more potential weldment features from the set of wire-bodies, wherein each of the one or more potential weldment features is analysed with respect to the face of the sheet-metal model; and
    identifying, by the identifying device, from the one or more potential weldment features, at least one related pair of weldment features, wherein weldment features of each related pair comprise one of a contacting relationship and crossing relationship with each other.

2. The method as claimed in claim 1 further comprises determining one or more welding parameters for performing welding operation based on the at least one related pair of weldment features, wherein the one or more welding parameters comprise:
    a face of the sheet-metal body associated with each weldment feature of the at least one related pair of weldment features;
    a shape associated with each weldment feature of the at least one related pair of weldment features, wherein the shape is one of a straight line, a circle, an ellipse, or a spline;
    a length of each weldment feature of the at least one related pair of weldment features; and
    a starting point, a middle point, and an end point associated with each weldment feature of the at least one related pair of weldment features.

3. The method as claimed in claim 1 further comprising:
    upon extracting the plurality of wire bodies from the sheet-metal model, validating each of the plurality of wire bodies based on one or more validating criteria, the one or more validating criteria comprising:
        whether a bounding envelope associated with the wire-body from the plurality of wire bodies is contained or overlapped with a bounding envelope of the sheet-metal model.

4. The method as claimed in claim 1, wherein the set of wire bodies associated with the face of the sheet-metal model is identified based on:
    selecting the set of wire bodies from the plurality of wire-bodies, wherein, for each of the set of wire bodies:
        the gap between the first point and the second point is less than a predefined gap;
        the face normal associated with the second point and the tangent vector associated with the first point is orthogonal;
        the gap between the region proximate to the first point and the proximate second point is less than the predefined gap; and
        the face normal associated with the proximate second point and the tangent vector associated with the region proximate to the first point is orthogonal.

5. The method as claimed in claim 1, wherein the contacting relationship is based on:
    a bounding envelope associated with a weldment feature of the related pair of weldment features is intersecting or contained with a bounding envelope associated with the other weldment feature of the pair of weldment features; and
    each weldment feature of the related pair of weldment features comprises end-to-end connectivity.

6. The method as claimed in claim 1, wherein the crossing relationship is based on:
    a bounding envelope associated with a weldment feature of the related pair of weldment features is intersecting or contained with a bounding envelope associated with the other weldment feature of the pair of weldment features; and each weldment feature of the related pair of weldment features crosses or touches the other weldment feature at an associated point.

7. A system for identifying a weldment feature, the system comprising:
   a processor; and
   a memory communicatively coupled to the processor, wherein the memory stores a plurality of instructions, which upon execution by the processor, cause the processor to:
      extract a plurality of wire bodies from a sheet-metal model;
      identify from the plurality of wire bodies, a set of wire bodies associated with a face of the sheet-metal model, wherein the set of wire bodies associated with the face of the sheet-metal model is identified based on:
         discretizing the wire-body into a plurality of points, based on a predefined parameter;
         for a first point of the plurality of points associated with the wire-body, determining a second point on the face of the sheet-metal model closest to the first point;
         determining a gap between the first point and the second point;
         determining a face normal associated with the second point and a tangent vector associated with the first point;
         within a region proximate to the first point, determining a proximate second point on the face of the sheet-metal model closest to the region proximate to the first point;
         determining a gap between the region proximate to the first point and the proximate second point;
         determining a face normal associated with the proximate second point and a tangent vector associated with the region proximate to the first point; and;
      generate one or more potential weldment features from the set of wire-bodies, wherein each of the one or more potential weldment features is analysed with respect to the face of the sheet-metal model; and
      identify, from the one or more potential weldment features, at least one related pair of weldment features, wherein weldment features of each related pair comprise one of a contacting relationship and crossing relationship with each other.

8. The system as claimed in claim 7, wherein the plurality of instructions further cause the processor to:
   determine one or more welding parameters for performing welding operation based on the at least one related pair of weldment features, wherein the one or more welding parameters comprise:
      a face of the sheet-metal body associated with each weldment feature of the at least one related pair of weldment features;
      a shape associated with each weldment feature of the at least one related pair of weldment features, wherein the shape is one of a straight line, a circle, an ellipse, or a spline;
      a length of each weldment feature of the at least one related pair of weldment features; and
      a starting point, a middle point, and an end point associated with each weldment feature of the at least one related pair of weldment features.

9. The system as claimed in claim 7, wherein the plurality of instructions further cause the processor to:
   upon extracting the plurality of wire bodies from the sheet-metal model, validate each of the plurality of wire bodies based on one or more validating criteria, the one or more validating criteria comprising:
      whether a bounding envelope associated with the wire-body from the plurality of wire bodies is contained or overlapped with a bounding envelope of the sheet-metal model.

10. The system as claimed in claim 7, wherein the set of wire bodies associated with the face of the sheet-metal model is identified based on:
   selecting the set of wire bodies from the plurality of wire-bodies, wherein, for each of the set of wire bodies:
      the gap between the first point and the second point is less than a predefined gap;
      the face normal associated with the second point and the tangent vector associated with the first point is orthogonal;
      the gap between the region proximate to the first point and the proximate second point is less than the predefined gap; and
      the face normal associated with the proximate second point and the tangent vector associated with the region proximate to the first point is orthogonal.

11. The system as claimed in claim 7,
   wherein the contacting relationship is based on:
      a bounding envelope associated with a weldment feature of the related pair of weldment features is intersecting or contained with a bounding envelope associated with the other weldment feature of the pair of weldment features; and
      each weldment feature of the related pair of weldment features comprises end-to-end connectivity; and
   wherein the crossing relationship is based on:
      a bounding envelope associated with a weldment feature of the related pair of weldment features is intersecting or contained with a bounding envelope associated with the other weldment feature of the pair of weldment features; and
      each weldment feature of the related pair of weldment features crosses or touches the other weldment feature at an associated point.

12. A non-transitory computer-readable medium storing computer-executable instructions for identifying a weldment feature, the computer-executable instructions configured for:
   extracting a plurality of wire bodies from a sheet-metal model;
   identifying from the plurality of wire bodies, a set of wire bodies associated with a face of the sheet-metal model, wherein the set of wire bodies associated with the face of the sheet-metal model is identified based on:
      discretizing the wire-body into a plurality of points, based on a predefined parameter;
      for a first point of the plurality of points associated with the wire-body, determining a second point on the face of the sheet-metal model closest to the first point;
      determining a gap between the first point and the second point;
      determining a face normal associated with the second point and a tangent vector associated with the first point;
      within a region proximate to the first point, determining a proximate second point on the face of the sheet-metal model closest to the region proximate to the first point;

determining a gap between the region proximate to the first point and the proximate second point;

determining a face normal associated with the proximate second point and a tangent vector associated with the region proximate to the first point; and;

generating one or more potential weldment features from the set of wire-bodies, wherein each of the one or more potential weldment features is analysed with respect to the face of the sheet-metal model; and identifying from the one or more potential weldment features, at least one related pair of weldment features, wherein weldment features of each related pair comprise one of a contacting relationship and crossing relationship with each other.

13. The non-transitory computer-readable medium of the claim 12, wherein the computer-executable instructions further configured for:

determining one or more welding parameters for performing welding operation based on the at least one related pair of weldment features, wherein the one or more welding parameters comprise:
  a face of the sheet-metal body associated with each weldment feature of the at least one related pair of weldment features;
  a shape associated with each weldment feature of the at least one related pair of weldment features, wherein the shape is one of a straight line, a circle, an ellipse, or a spline;
  a length of each weldment feature of the at least one related pair of weldment features; and
  a starting point, a middle point, and an end point associated with each weldment feature of the at least one related pair of weldment features.

14. The non-transitory computer-readable medium of the claim 12, wherein the computer-executable instructions further configured for:

upon extracting the plurality of wire bodies from the sheet-metal model, validating each of the plurality of wire bodies based on one or more validating criteria, the one or more validating criteria comprising:
  whether a bounding envelope associated with the wire-body from the plurality of wire bodies is contained or overlapped with a bounding envelope of the sheet-metal model.

15. The non-transitory computer-readable medium of the claim 11, wherein the set of wire bodies associated with the face of the sheet-metal model is identified based on:

selecting the set of wire bodies from the plurality of wire-bodies, wherein, for each of the set of wire bodies:
  the gap between the first point and the second point is less than a predefined gap;
  the face normal associated with the second point and the tangent vector associated with the first point is orthogonal;
  the gap between the region proximate to the first point and the proximate second point is less than the predefined gap; and
  the face normal associated with the proximate second point and the tangent vector associated with the region proximate to the first point is orthogonal.

16. The non-transitory computer-readable medium of the claim 12, wherein the contacting relationship is based on:
  a bounding envelope associated with a weldment feature of the related pair of weldment features is intersecting or contained with a bounding envelope associated with the other weldment feature of the pair of weldment features; and
  each weldment feature of the related pair of weldment features comprises end-to-end connectivity.

17. The non-transitory computer-readable medium of the claim 12, wherein the crossing relationship is based on:
  a bounding envelope associated with a weldment feature of the related pair of weldment features is intersecting or contained with a bounding envelope associated with the other weldment feature of the pair of weldment features; and
  each weldment feature of the related pair of weldment features crosses or touches the other weldment feature at an associated point.

\* \* \* \* \*